United States Patent [19]
Deck

[11] Patent Number: 6,014,324
[45] Date of Patent: Jan. 11, 2000

[54] VOLTAGE REGULATOR FOR A PERMANENT MAGNET ALTERNATOR

[75] Inventor: Gary Lee Deck, Bethel, Pa.

[73] Assignee: The Whitaker Corporation, Wilmington, Del.

[21] Appl. No.: 09/115,973

[22] Filed: Jul. 15, 1998

[51] Int. Cl.[7] .................................................. H02M 5/42
[52] U.S. Cl. ............................................................ 363/86
[58] Field of Search ............................... 363/85, 86, 125, 363/128; 323/266, 282, 284; 322/27, 28

[56] References Cited

U.S. PATENT DOCUMENTS

| | | | |
|---|---|---|---|
| 3,723,844 | 3/1973 | Cavil | 320/59 |
| 4,439,721 | 3/1984 | Mura | 322/31 |
| 4,659,978 | 4/1987 | Dogadko | 320/71 |
| 4,766,362 | 8/1988 | Sadvary | 322/50 |
| 5,323,095 | 6/1994 | Kumar | 318/376 |
| 5,392,747 | 2/1995 | Nickel et al. | 123/417 |
| 5,502,368 | 3/1996 | Syverson et al. | 322/28 |

*Primary Examiner*—Matthew Nguyen

[57] ABSTRACT

A voltage regulator (12) for controlling and limiting the output voltage of an alternator (10) includes a control circuit having a full wave rectifier (28) for impressing a series of half wave pulses (32) onto a first circuit (34) in correspondence to the output of the alternator (10). A gate controlled switch (36) is utilized to conduct the half wave pulses (32) to the output circuit (24) when a gate signal is present. A voltage detector (44) monitors the output voltage and shunts the gate signal to ground when the output voltage reaches a given upper value and removes the shunt when the output voltage recedes to a given lower value.

15 Claims, 2 Drawing Sheets

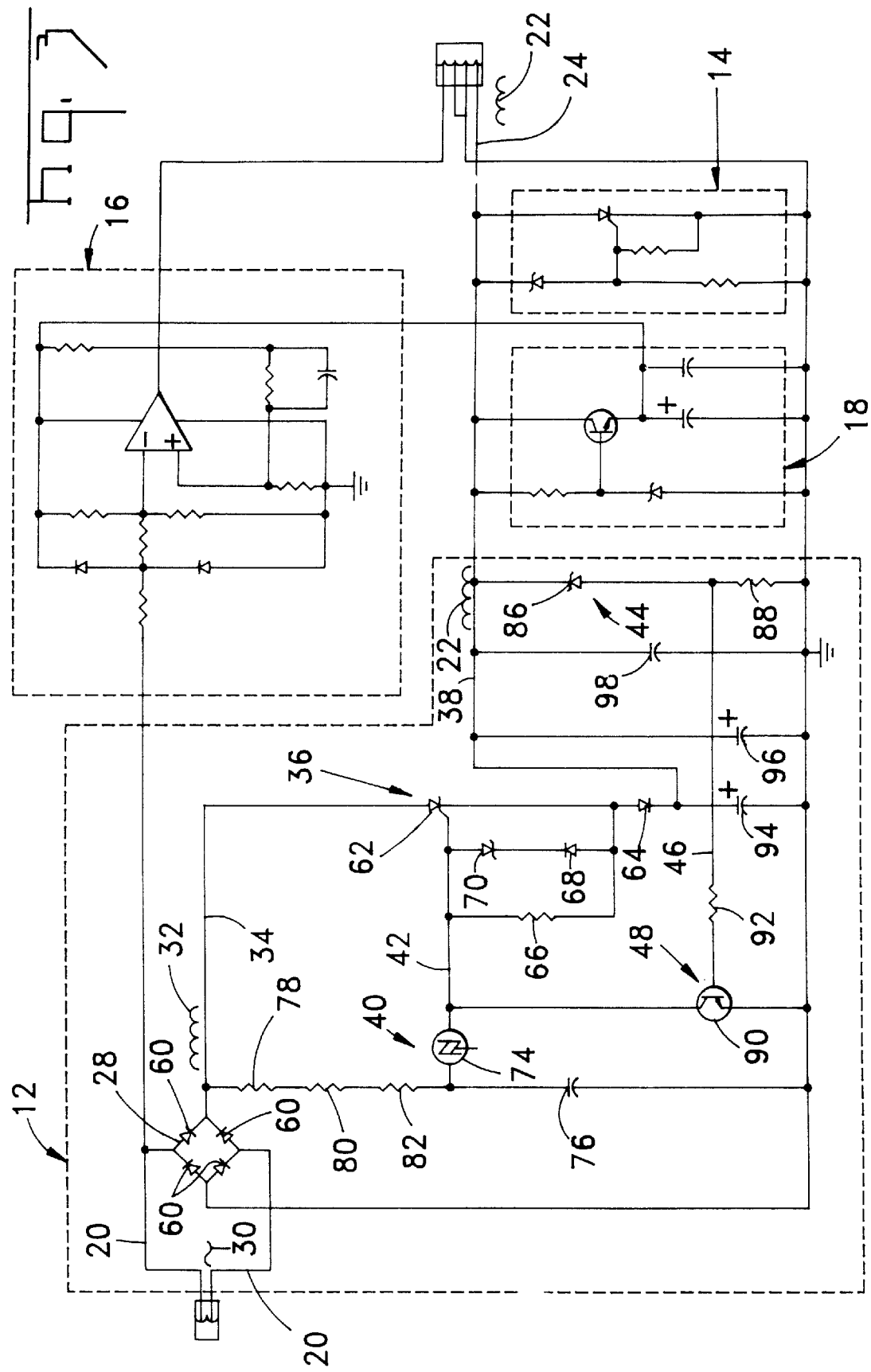

VOLTAGE REGULATOR FOR A PERMANENT MAGNET ALTERNATOR

The present invention relates to a voltage regulator for a permanent magnet alternator and more particularly to such a regulator having a feed back circuit for limiting the output voltage.

BACKGROUND OF THE INVENTION

Alternators for generating electrical power typically include an electromagnet for generating a field of magnetic flux. The output voltage of the alternator is commonly regulated by varying the current flow through this electromagnet and thereby varying the field flux. Permanent magnet alternators, on the other hand, have a relatively fixed field flux supplied by permanent magnets. One method of regulating the output voltage of the alternator is to mechanically move either the permanent magnets or some other member that affects the flux that the moving coil encounters during operation. One such device is disclosed in U.S. Pat. No. 4,766,362 which issued Aug. 23, 1988 to Sadvary. This permanent magnet alternator utilized a magnetic flux modulating sleeve that is carried by and rotates with the rotor. The physical position of the sleeve with respect to the rotor is changeable during rotor rotation to vary the flux field and provide a constant voltage output during load and rotor speed variations. Such mechanical systems of control, however, are not sufficiently responsive to changing load and speed conditions found in some applications. Additionally, such mechanical systems are relatively expensive to manufacture, are prone to wear and tear, and require significant maintenance to remain operational. Another method of regulating the output voltage of the alternator is to provide a separate wound field that can have a forward polarity current applied for enhancing the affect of the flux field of the permanent magnets during low speed rotation of the alternator rotor and a reverse polarity current to offset the affect of the flux field during high speed rotation. Such a voltage regulator system is disclosed in U.S. Pat. No. 5,502,368 which issued Mar. 26, 1996 to Syverson et al. An additional method of regulating the output voltage of a permanent magnet alternator is disclosed in U.S. Pat. No. 4,659,978 which issued Apr. 21, 1987 to Dogadko. The regulator of the '978 patent utilizes a pair of silicon controlled rectifiers (SCR) to shunt the output current of the alternator to ground when the output voltage exceeds a desired value. This method requires a somewhat complex circuit structure that can be expensive to manufacture. Another method of regulating the output voltage of a permanent magnet alternator is to apply a selected load to the output thereby causing the voltage to vary in correspondence to the applied load. This is sometimes accomplished by simply a fixed resistance, or by a more sophisticated circuit that senses the amount of change in load needed to effect a desired change in output voltage and then applying that precise amount of load. In any case, the application of an additional load to the alternator causes substantial heat that must be dissipated and wastes energy that could otherwise be utilized.

What is needed is a voltage regulator for a permanent magnet alternator that is effective during a wide range of rotor speed and load variations, and that requires little or no maintenance. Additionally, the regulator should be relatively simple and inexpensive to manufacture and should not generate substantial unnecessary additional heat or waste energy.

SUMMARY OF THE INVENTION

A voltage regulator is provided for controlling and limiting the output voltage of an alternator. The regulator includes a control circuit having a full wave rectifier for impressing a series of half wave pulses to a first circuit in correspondence to the output of the alternator. A transistor is included having a gate, an anode connected to the first circuit, and a cathode connected to a second circuit. A gate control is connected to the first circuit and is arranged to generate an output signal when the half wave pulses produce a sufficiently high input voltage to the gate control. The output signal is impressed onto a gate circuit connected to the gate of the transistor for rendering the transistor conductive. A detector is connected to the second circuit for impressing a clamping signal onto a third circuit upon detection of a specific voltage level on the second circuit. A drain is connected to the gate circuit and the third circuit for interconnecting the gate circuit to ground only when the clamping signal is on the third circuit.

An embodiment of the invention will now be described by way of example with reference to the following drawings.

DESCRIPTION OF THE FIGURES

FIG. 3 is an electrical schematic diagram of the power system shown in FIG. 1.

DESCRIPTION OF AN EMBODIMENT OF THE INVENTION

Figure 1:
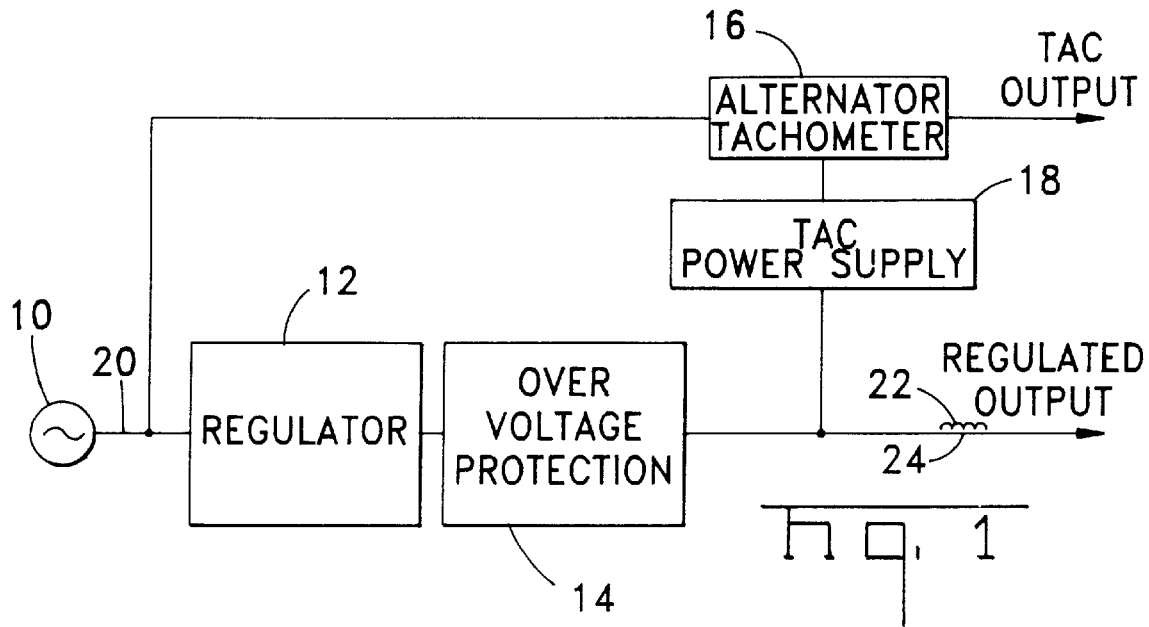
FIG. 1 is a block diagram of the major components of a power system incorporating the teachings of the present invention.
Figure 2:
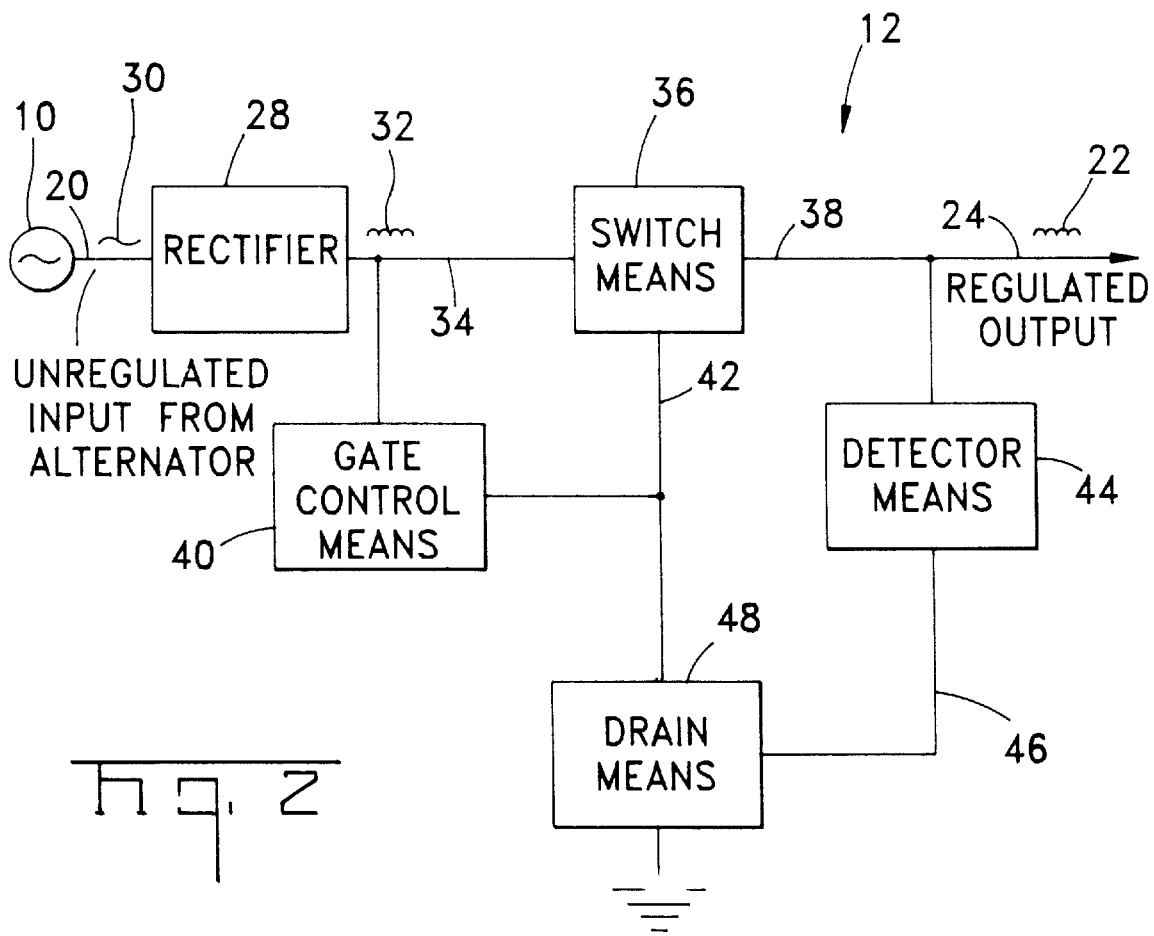
FIG. 2 is a block diagram of the voltage regulator shown in FIG. 1.

There is shown in FIG. 1 a block diagram of a permanent magnet alternator 10 interconnected to a voltage regulator 12, an overvoltage protection circuit 14, an alternator tachometer 16, and a tachometer power supply 18. The unregulated alternating current from the alternator is supplied on the input circuit 20 and the rectified and regulated power, indicated at 22, is impressed on the output circuit 24. The regulator 12, as shown in FIG. 2, includes a full wave rectifier 28 that receives a series of full wave pulses 30 from the permanent magnet alternator 10 and produces a corresponding series of half wave pulses 32 on a first circuit 34. The first circuit is interconnected to a switch 36 which, when conducting, interconnects the first circuit 34 to a second circuit 38 and carries the regulated power 22 to the output circuit 24. A gate control 40 is interconnected to the first circuit 34 and to a gate circuit 42 from the switch 36. The gate control 40 is arranged to generate an output signal on the gate circuit 42 when the half wave pulses 32 produce a sufficiently high input voltage to the switch. This output signal causes the switch 36 to become conductive, thereby interconnecting the first and second circuits. A detector 44 is interconnected to the second circuit 38 for impressing a clamping signal onto a third circuit 46 which is connected to a drain 48. The drain is also connected to the gate circuit 42 and is arranged so that when the clamping signal is applied to the third circuit the gate circuit is shunted to ground thereby causing the switch 36 to become nonconductive. In the absence of the clamping signal the switch 36 remains conductive.

The entire power system shown in FIG. 1 is shown in more detail in the schematic diagram of FIG. 3. While the present invention is directed to the voltage regulator circuitry contained within the dashed lines identified by the arrow 12, in FIG. 3, the over voltage protection circuit 14, alternator tachometer 16, and the tachometer power supply 18 are similarly identified with appropriate arrows for the purpose of showing the regulator in a typical operating environment. Accordingly, only the voltage regulator 12 of the present invention will be described in detail, as follows.

The voltage regulator 12, as best seen in FIG. 3, includes a full wave rectifier 28 composed of four diodes 60 interconnected in the usual manner for receiving the full wave alternating current pulses 30 from the alternator 10 and impressing the half wave pulses 32 onto the first circuit 34, which connects to both the switch 36 and the gate control 40. The switch 36 includes a sensitive gate silicon controlled rectifier (SCR) 62, of the type MCR8SN, having its anode connected to the first circuit, its gate connected to the gate circuit 42, and its cathode connected to the anode of a protection diode 64. The cathode of the protection diode 64 is connected to the second circuit 38. Additionally, the switch 36 includes a 4.7 K ohm gate cathode resistor 66 and a pair of opposing diodes 68 and 70, of the type 1N5819 and 1N4731 respectively, interconnected between the gate and cathode of the SCR 62, as shown. The protection diode 64 prevents reverse current that may damage the SCR 62 while the opposing diodes 68 and 70 prevent reverse voltage over about 5 volts that may also damage the SCR. It will be understood that the sensitive gate SCR 62 may be replaced with other suitable devices such as an appropriate thyristor or transistor as long as appropriate corresponding changes are made to the related interface circuitry. The gate control 40 includes a silicon bilateral switch 74, of the type MBS4991, having two leads, a 0.01 uf capacitor 76 connected to ground, and three 62 K ohm resistors 78, 80, and 82, placed in series with the capacitor. One of the leads of the bilateral switch 74 is connected to the gate circuit 42 and the other lead is connected to the junction of the capacitor 76 and resistor 82. The opposite end of the resistor 78 is connected to the first circuit 34. The detector 44 includes a zener diode 86, of the type 1N4705, and 62 ohm resistor 88. The zener diode has its cathode connected to the second circuit 38 and its anode connected to one lead of the resistor 88, the other lead of the resistor being connected to ground. The junction between the zener diode 86 and the resistor 88 is connected to the third circuit 46. The drain 48 includes a transistor 90, of the type MJE243, and a 1 K ohm resistor 92, one lead of which is connected to the base of the transistor and the other lead of which is connected to the third circuit 46. The collector of the transistor 90 is connected to the gate circuit 42 and the emitter is connected to ground, as shown in FIG. 3. An energy storage device, in the form of a pair of parallel 4700 uf capacitors 94 and 96, is connected between the second circuit 38 and ground. The energy storage device may take other suitable forms as well, such as a single large capacitor. A 0.1 uf bypass capacitor 98 is also connected between the second circuit 38 and ground to shunt any relatively high frequency transient current that may be present on the second circuit to ground.

In operation, as best seen in FIG. 3, the positive half wave pulses 32 are applied to the resistor 78 and SCR 62. Current flows through resistors 78, 80, and 82 to charge the capacitor 76. When the voltage across the silicon bilateral switch 74 exceeds approximately 8 volts, the bilateral switch begins conducting so that current flows from the capacitor 76 onto the gate circuit 42 and to the gate of the SCR 62 causing the SCR 62 to begin conducting current from its anode to its cathode. The current flows through the diode 64 and charges the two parallel capacitors 94 and 96. The SCR 62 continues to be conductive for the entire period of each applied pulse 32. As the applied voltage of each pulse decreases, the current through the SCR 62 correspondingly decreases. When the current flowing through the SCR 62 falls below the holding current, the SCR 62 reverts to a non-conducting state. This cycle continues repeatedly until a sufficient number of half wave positive pulses have been applied to the capacitors 94 and 96 to raise the voltage across them to the desired output voltage of the regulator 12 which, in the present example, is between 18 and 20 volts. When the output voltage on the second circuit 38 exceeds the breakdown voltage rating of the zener diode 86, the transistor 90 will begin conducting. This drains gate current from the gate circuit 42 away to ground thereby suspending application of gating pulses to SCR 62. With power pulses no longer being applied to the two capacitors 94 and 96, the voltage across these capacitors will begin decreasing at a rate determined by the load applied to the output circuit 24. When the voltage across the two capacitors 94 and 96 falls below the breakdown voltage of the zener diode 86, the transistor 90 will no longer be conductive. Gate pulses will again be applied to the SCR 62 which will become conductive and the two capacitors 94 and 96 will again charge to the desired output voltage. During this entire operating cycle, the full wave pulses 30 are rectified to half wave positive pulses and applied to the output circuit 24 at a regulated desired voltage.

While the present invention has been described in terms of a voltage regulator for a single phase permanent magnet alternator, it will be understood that the teachings of the present invention may be advantageously utilized with any permanent magnet alternator having a poly-phase configuration.

An important advantage of the present invention is that the output voltage of a permanent magnet regulator is effectively regulated over a wide range of rotor speeds and load variations. Further, the voltage regulator of the present invention is relatively simple and inexpensive to manufacture and does not generate substantial unnecessary additional heat or waste energy.

What is claimed is:

1. In a voltage regulator for limiting the output voltage of an alternator, a control circuit comprising:

(1) a full wave rectifier for impressing a series of half wave pulses onto a first circuit in correspondence with the output of said alternator;

(2) a switch having a gate, an anode connected to said first circuit, and a cathode connected to a second circuit;

(3) a gate control connected to said first circuit and arranged to generate an output signal when said half wave pulses produce a sufficiently high input voltage to said gate control, and impresses said output signal onto a gate circuit connected to said gate of said switch for rendering said switch conductive;

(4) a detector connected to said second circuit for impressing a clamping signal onto a third circuit upon detection of a specific voltage level on said second circuit; and (5) a drain connected to said gate circuit and said third circuit for interconnecting said gate circuit to ground only when said clamping signal is on said third circuit.

2. The voltage regulator according to claim 1 wherein said switch is a sensitive gate silicon controlled rectifier.

3. The voltage regulator according to claim 2 including a protection diode arranged between said sensitive gate silicon controlled rectifier and said second circuit.

4. The voltage regulator according to claim 1 wherein said gate control includes a bilateral switch interconnected between said first circuit and said gate circuit, and a storage capacitor interconnected between ground and the junction of said bilateral switch and said first circuit.

5. The voltage regulator according to claim 1 wherein said drain is a transistor having its collector connected to said gate circuit, its emitter connected to ground, and its base connected to said third circuit.

6. The voltage regulator according to claim 1 including an energy storage device connected between said second circuit and ground for storing electrical energy only while said switch is conductive.

7. The voltage regulator according to claim 1 wherein said detector includes a zener diode and a resistor, the cathode of said zener diode connected to said second circuit and the anode of said zener diode connected to one lead of said resistor, the other lead of said resistor being connected to ground, wherein the junction between said zener diode and said resistor is connected to said third circuit.

8. In a voltage regulator for limiting the output voltage of an alternator, a control circuit comprising:

(1) a full wave rectifier for impressing a series of half wave pulses onto a first circuit in correspondence with the output of said alternator;

(2) a switch interconnected to said first circuit and arranged to conduct said half wave pulses to a second circuit only when receiving an output signal;

(3) a control connected to said first circuit and arranged to generate and apply said output signal to said switch when said half wave pulses produce a sufficiently high input voltage to said control, (4) a detector for generating a clamping signal upon detection of a specific voltage level on said second circuit; and (5) a drain for blocking said application of said output signal to said switch upon said generation of said clamping signal.

9. The voltage regulator according to claim 8 wherein said switch is a sensitive gate silicon controlled rectifier having an anode, a cathode, and a gate.

10. The voltage regulator according to claim 9 including a protection diode arranged between said cathode of said sensitive gate silicon controlled rectifier and said second circuit.

11. The voltage regulator according to claim 10 wherein said control impresses said output signal onto a gate circuit connected to said gate of said sensitive gate silicon controlled rectifier for rendering said rectifier conductive.

12. The voltage regulator according to claim 11 wherein said switch includes a bilateral switch interconnected between said first circuit and said gate circuit, and a storage capacitor interconnected between ground and the junction of said bilateral switch and said first circuit.

13. The voltage regulator according to claim 11 wherein said drain is a transistor having its collector connected to said gate circuit, its emitter connected to ground, and its base connected to a third circuit.

14. The voltage regulator according to claim 8 including an energy storage device connected between said second circuit and ground for storing electrical energy only while said switch is conductive.

15. The voltage regulator according to claim 8 wherein said detector includes a zener diode and a resistor, the cathode of said zener diode connected to said second circuit and the anode of said zener diode connected to one lead of said resistor, the other lead of said resistor being connected to ground, wherein the junction between said zener diode and said resistor is connected to said drain.

\* \* \* \* \*